United States Patent [19]

Kishi

[11] Patent Number: 4,741,413

[45] Date of Patent: May 3, 1988

[54] ELEVATING APPARATUS

[75] Inventor: Mitsuhiro Kishi, Ashikaga, Japan

[73] Assignee: Kabushiki Kaisha Hikoma Seisakusho, Tochigi, Japan

[21] Appl. No.: 948,458

[22] Filed: Dec. 29, 1986

Related U.S. Application Data

[63] Continuation of Ser. No. 646,891, Aug. 30, 1984, abandoned.

[30] Foreign Application Priority Data

Nov. 29, 1983 [JP] Japan ............................... 58-224679

[51] Int. Cl.[4] .......................... B60S 13/00; E04G 1/18

[52] U.S. Cl. ................................ 187/8.72; 187/9 R; 182/141; 91/520; 74/521; 52/109; 254/9 C; 414/589

[58] Field of Search ........................ 187/18, 8.72, 9 R; 182/69, 157, 158, 141, 200; 254/122, 9 C; 414/589; 91/520; 60/546; 52/109, 115; 74/521

[56] References Cited

U.S. PATENT DOCUMENTS

| | | | |
|---|---|---|---|
| 3,476,016 | 11/1969 | Dixon | 187/18 |
| 3,820,631 | 6/1974 | King et al. | 182/141 |
| 4,130,178 | 12/1978 | Smith, Jr. | 187/18 |
| 4,343,379 | 8/1982 | Haulotte | 187/18 |
| 4,455,921 | 6/1984 | Griesbach | 91/520 |
| 4,466,509 | 8/1984 | Kishi | 187/18 |
| 4,484,663 | 11/1984 | Wyse | 187/9 E |
| 4,518,061 | 5/1985 | Wehmeyer et al. | 254/122 X |

FOREIGN PATENT DOCUMENTS

| | | | |
|---|---|---|---|
| 58-2198 | 1/1983 | Japan | 187/18 |
| 58-2197 | 1/1983 | Japan | 187/18 |
| 58-36900 | 3/1983 | Japan | 187/18 |

*Primary Examiner*—F. J. Bartuska
*Assistant Examiner*—Gregory L. Huson
*Attorney, Agent, or Firm*—Koda and Androlia

[57] ABSTRACT

An elevating apparatus including a base, a platform, at least a pair of pivotally interconnected boom assemblies connecting the base and the platform together, the pair of boom assemblies including a pair of hollow middle booms pivotally interconnected substantially centrally thereof by a shaft, and upper and lower booms telescopically disposed in each of the middle booms and movable out of upper and lower ends of the middle booms, the lower booms having ends pivotally mounted on the base in spaced relation and the upper booms having ends pivotally mounted on the platform in spaced relation, each of the boom assemblies including a synchronizer for synchronizing intervals of extension of the upper and lower booms from the middle boom, a pair of hydraulic mechanisms operatively coupled between the shaft and the base at spaced locations thereon for moving the middle booms to displace the upper and lower booms into and out of the middle booms to lift and lower the platform, and a controller for selectively controlling the hydraulic mechanisms to move the platform substantially vertically and horizontally.

10 Claims, 14 Drawing Sheets

ELEVATING APPARATUS

This is a continuation of application Ser. No. 646,891, filed Aug. 30, 1984, now abandoned.

BACKGROUND OF THE INVENTION

1. Field of the Invention

The present invention relates to an elevating apparatus for lifting workers and materials to a higher place and lowering unwanted materials.

2. Description of the Prior Art

There have heretofore been used elevating apparatus for elevating a lifting table to lift workers and/or materials to higher places for assembly, painting, repair in various locations such as construction sites, highways, and other areas requiring work at elevated levels. Such elevating apparatus include boom-type lifts and scissors-type lifts. The boom-type lift includes a plurality of booms telescopically assembled together. The boom-type lift can move a bucket to a higher place by increasing the number of telescopically assembled booms. However, the booms would tend to be bent if the length thereof were unduly increased. Another disadvantage with the boom-type lift is that it cannot lift heavy objects. The scissors-type lift is in the form of a pantograph comprising X-shaped arms which are vertically connected. In each of the X-shaped arm structure, two arms are centrally pivotally interconnected. The scissors-type lift can lift relatively heavy objects. However, in order to raise a platform to a higher location, each of the arms has to be increased in length or the number of X-shaped arm units has to be increased. This has led to problems in that the platform is liable to swing at an elevated level, and the arms as they are folded have an increased height from the ground, making it tedious and time-consuming for workers and materials to be placed on and off the platform.

To cope with the foregoing difficulties, there has been proposed an elevating mechanism in which a plurality of booms are telescopically inserted in one arm so that the arm can be longitudinally expanded (see for example Japanese Patent Applications Nos. 56-134487 and 56-191065). FIG. 1 of the accompanying drawings illustrates the proposed elevating mechanism. Hollow middle booms A, B are centrally interconnected by a shaft C in the form of an X, the booms A, B being angularly movable about the shaft C. Upper and lower booms D, E and F, G are telescopically disposed in the middle booms A, B and movable in and out of open ends thereof. A platform I is coupled to the upper booms D, E, and the lower booms F, G are connected to a base H. When the shaft c is moved upwardly by a hydraulic cylinder (not shown), the upper and lower booms D, E and F, G are drawn out of the open ends of the middle booms A, B to raise the platform I away from the base H. In order that the platform I will be vertically moved away from the base H, the upper and lower booms D, E and F, G have to be drawn out of the open ends of the middle booms A, B by the same distances L, and a synchronizing mechanism is required to control the intervals of movement of the upper and lower booms D, E and F, G. Although it is relatively easy to synchronize the upper and lower booms D, F or the upper and lower booms E, G, synchronization of the upper booms D, E requires a complex and large synchronizing mechanism because of the pivotal movement around the shaft C. If all of the upper and lower booms D, E and F, G are synchronized, then the platform I will be lifted and lowered only vertically, but in no other directions such as a horizontal direction. However, in actual use, the platform I may be required to move horizontally toward a desired location after it has been vertically lifted.

SUMMARY OF THE INVENTION

It is an object of the present invention to provide an elevating apparatus having a platform capable of moving vertically and horizontally so that the elevating apparatus can operate in a greater range.

Another object of the present invention is to provide an elevating apparatus having a platform which has a low folded position, can be lifted to a high elevated position, is stable, and can raise heavy objects.

According to the present invention, there is provided an elevating apparatus comprising a base, a platform, at least a pair of pivotally interconnected boom assemblies connecting the base and the platform together, the pair of boom assemblies including a pair of hollow middle booms pivotally interconnected substantially centrally thereof by a shaft, and upper and lower booms telescopically disposed in each of the middle booms and movable out of upper and lower ends of the middle booms, the lower booms having ends pivotally mounted on the base in spaced relation and the upper booms having ends pivotally mounted on the platform in spaced relation, each of the boom assemblies including means for synchronizing intervals of extension of the upper and lower booms from the middle boom, a pair of hydraulic mechanisms operatively coupled between the shaft and the base at spaced locations thereon for moving the middle booms to displace the upper and lower booms into and out of the middle booms to lift and lower the platform, and a means for selectively controlling the hydraulic mechanisms to move the platform substantially vertically and horizontally.

Further according to the present invention, there is provided an elevating apparatus comprising a base, a platform, at least a pair of pivotally interconnected boom assemblies connecting the base and the platform together, the pair of boom assemblies including a plurality of telescopically interfitted booms, the booms having ends mounted on the platform in spaced relation and ends mounted on the base in spaced relation, each of the boom assemblies including means for synchronizing intervals of extension of the booms, a plurality of hydraulic cylinders disposed in each of the boom assemblies and operatively connecting the booms for displacing the booms into and out of each other to lift and lower the platform, and a means on the boom emblies for clamping adjacent intermediate booms together while allowing the adjacent intermediate booms to be angularly moved relatively to each other when the boom assemblies are extended into an X shape.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
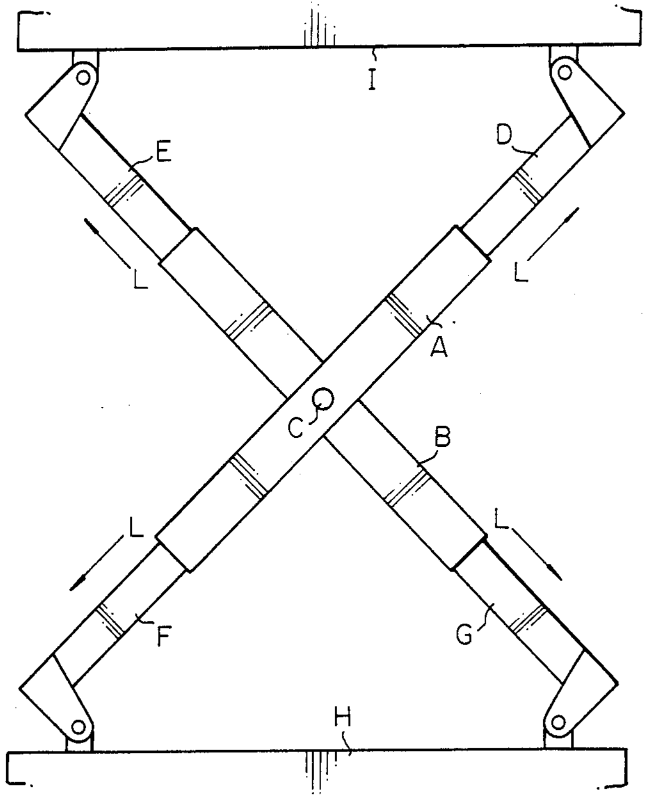
FIG. 1 PRIOR ART
FIG. 1 is a fragmentary side elevational view of a proposed elevating apparatus.
Figure 2:
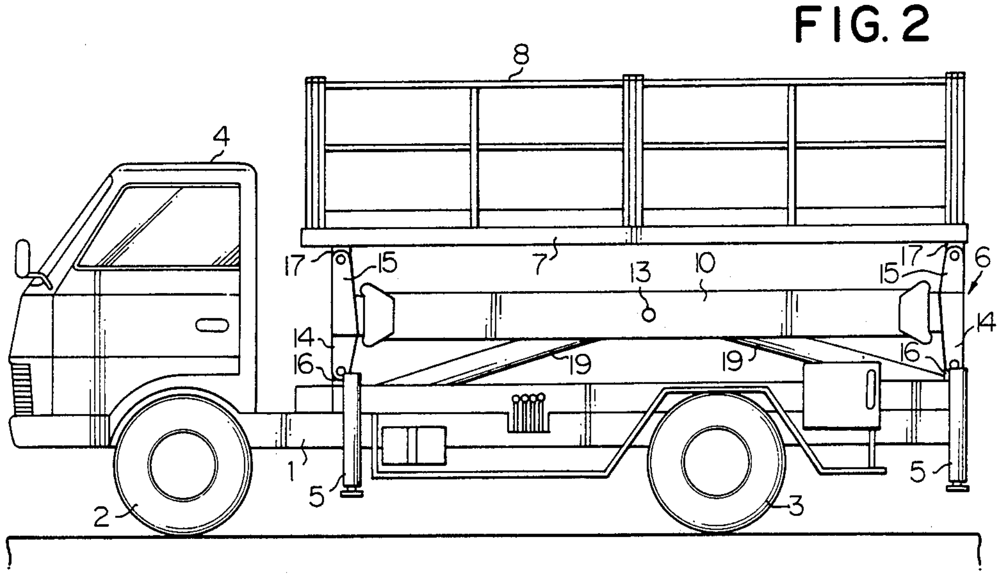
FIG. 2 is a side elevational view of an elevating apparatus according to an embodiment of the present invention, showing an elevating mechanism in a folded position.

As shown in FIG. 2, an elevating apparatus includes a truck having a chassis or base 1 on which front and rear wheels 2, 3 are rotatably supported, a driver's compartment 4 mounted on the chassis 1 above the front wheels 2, and pedestals or outriggers 5 attached to the chassis 1 at central and rear positions thereon. An elevating mechanism 6 is mounted on the chassis 1 and includes a platform 7 with handrails 8 extending therearound.

Figure 3:
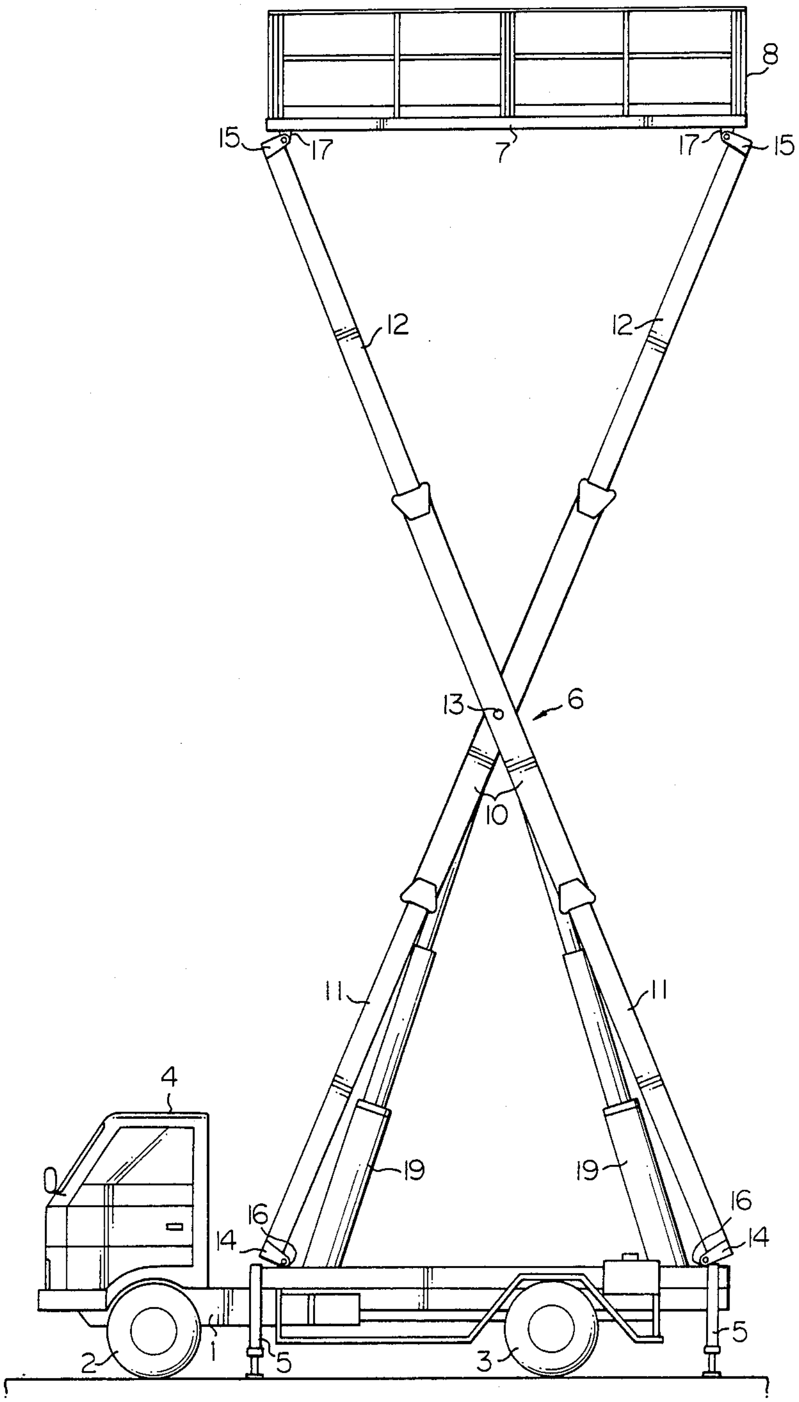
FIG. 3 is a side elevational view of the elevating apparatus with the elevating mechanism in an expanded position.
Figure 4:
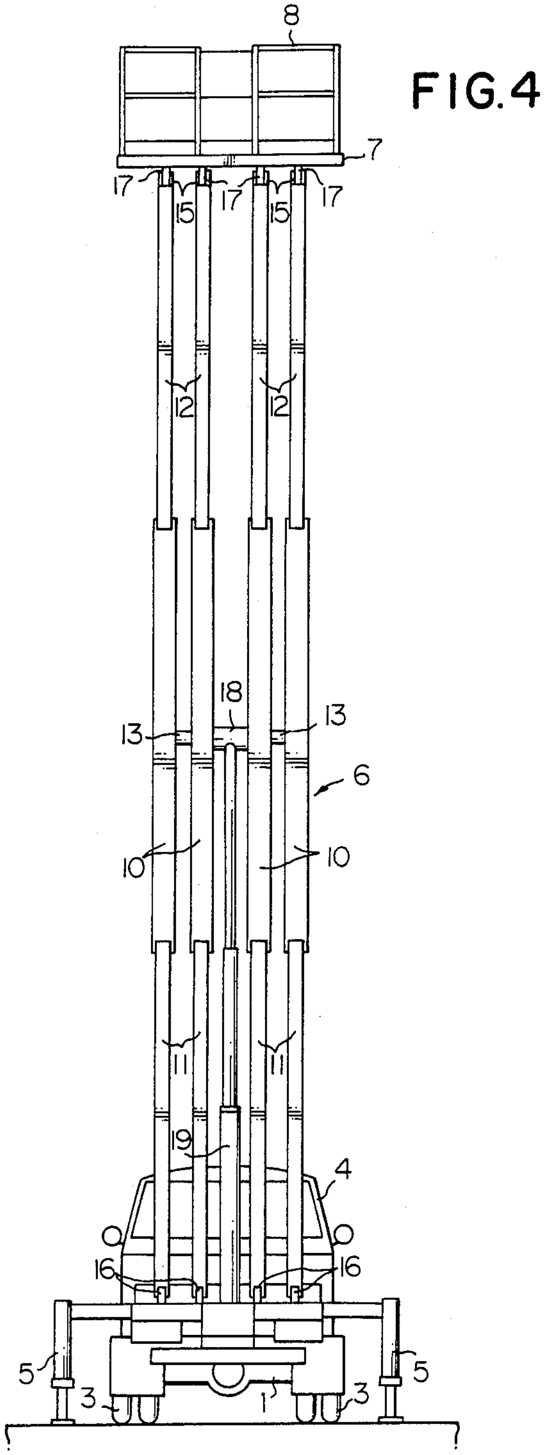
FIG. 4 is a rear elevational view of the elevating apparatus illustrated in FIG. 3.

As shown in FIG. 4, the elevating mechanism 6 comprises four extensible and contractable boom assemblies each composed of a middle boom 10, a lower boom 11, and an upper boom 12. The middle booms 10 are paired, and two middle booms 10 in each pair are interconnected centrally by a shaft 13 into an X shape, the middle booms 10 being pivotally movable. The lower booms 11 are telescopically disposed in the middle booms 10 and have connectors 14 secured to upper ends thereof. Likewise, the upper booms 12 are telescopically disposed in the middle booms 10 and have connectors 15 secured to upper ends thereof. The connectors 14 are pivotally connected by pins to fixed members 16 secured to the chassis 1, and the connectors 15 are pivotally connected by pins to fixed members 17 secured to the platform 7. The fixed members 16 and the fixed members 17 are horizontally spaced equal intervals so that the platform 7 remains parallel to the chassis 1 when the elevating mechanism is extended into the X-shape as shown in FIG. 3. The two pairs of the middle booms 10 are horizontally spaced from each other, and inner middle booms 10 in the boom pairs are interconnected centrally by a shaft 18 extending in alignment with the shafts 13. Two hydraulic mechanisms 19 are interconnected between the chassis 1 close to the fixed members 16 and the shaft 18, the hydraulic mechanisms 19 being attached to the chassis 1 at positions thereof which are equidistant from the shaft 18.

Figure 5:
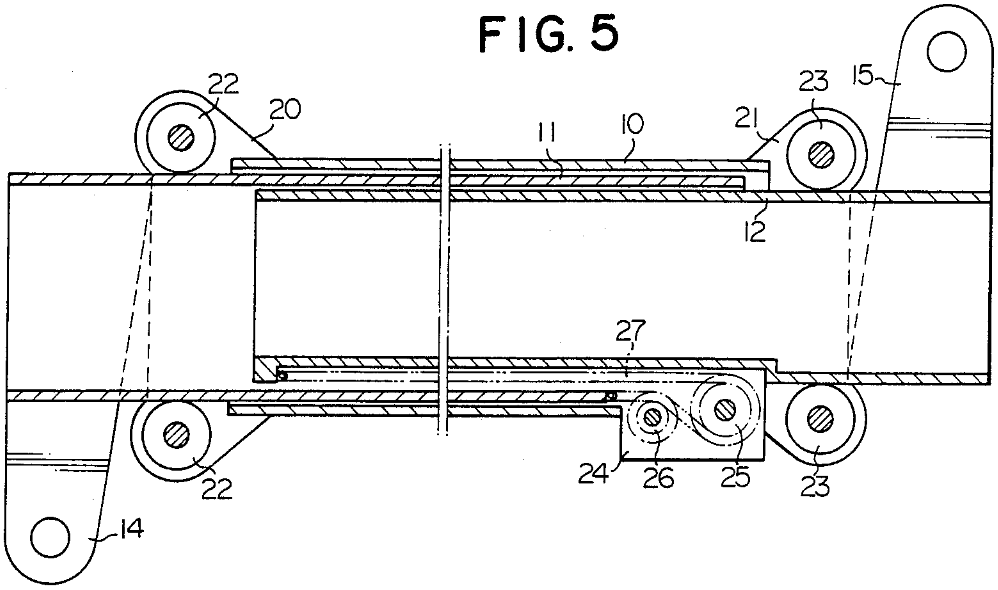
FIG. 5 is a longitudinal cross-sectional view of a middle boom.
Figure 6:
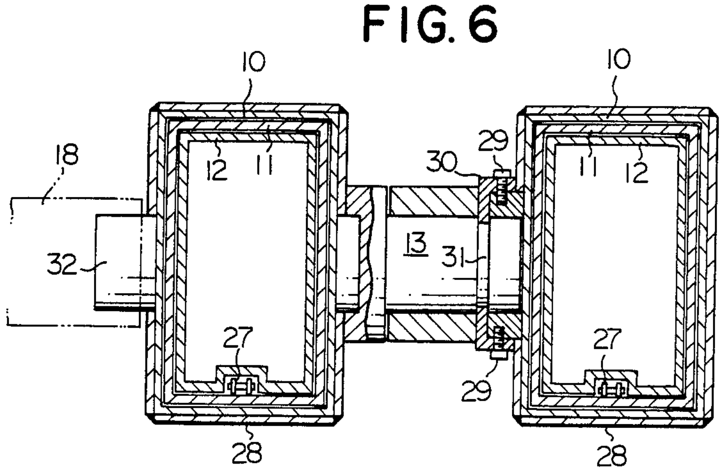
FIG. 6 is a transverse cross-sectional view of middle booms and a shaft interconnecting them.

FIGS. 5 and 6 illustrate the internal construction of the middle booms 10. Each of the middle booms 10 is made of thin sheet steel and has a hollow structure of a rectangular cross section. The lower boom 11 is slidably inserted in the middle boom 10 through one end thereof. The lower boom 11 is made of thin sheet steel and has a hollow structure of a rectangular cross section. The upper boom 12 is slidably inserted in the lower boom 11 through an opposite end of the middle boom 10. The upper boom 12 is made of thin sheet steel and has a hollow structure of a generally rectangular cross section. Substantially sectorial supports 20, 21 are secured respectively to the ends of the middle boom 10. Pairs of guide rollers 22, 23 are rotatably mounted on the supports 20, 21. The guide rollers 22 are held in rolling contact with opposite sides of the lower boom 11, while the guide rollers 23 are held in rolling contact with opposite sides of the upper boom 12. A gear box 24 is secured to the middle boom 10 adjacent to the support 21 and contains two sprockets 25, 26 rotatably supported therein. The distal end of the lower boom 11 and the distal end of the upper boom 12 are interconnected by a chain 27 trained around the sprockets 25, 26. The chain 27 is effective in synchronizing the lower and upper booms 11, 12 for enabling them to move in and out of the middle boom 10 by equal intervals.

FIG. 6 shows in cross section a central portion of each middle boom 10. A web-shaped holder 28 is wound around the central portion of the middle boom 10. The shaft 1 which is cylindrical in shape is fixed to one side of one of the holders 28, while an engagement member 30 secured by screws 29 to the other holder 28. The engagement member 30 has an edge fitted in a groove 31 defined in an outer periphery of the shaft 13. Thus, the two middle booms 10 are interconnected in the X shape and rendered angularly movable by the shaft 13 and the engagement member 30. A support shaft 32 is attached to the holder 28 on one of the middle booms 10 and projects away from the shaft 13. The shaft 18 is connected to the suppor shaft 32.

Figure 7:
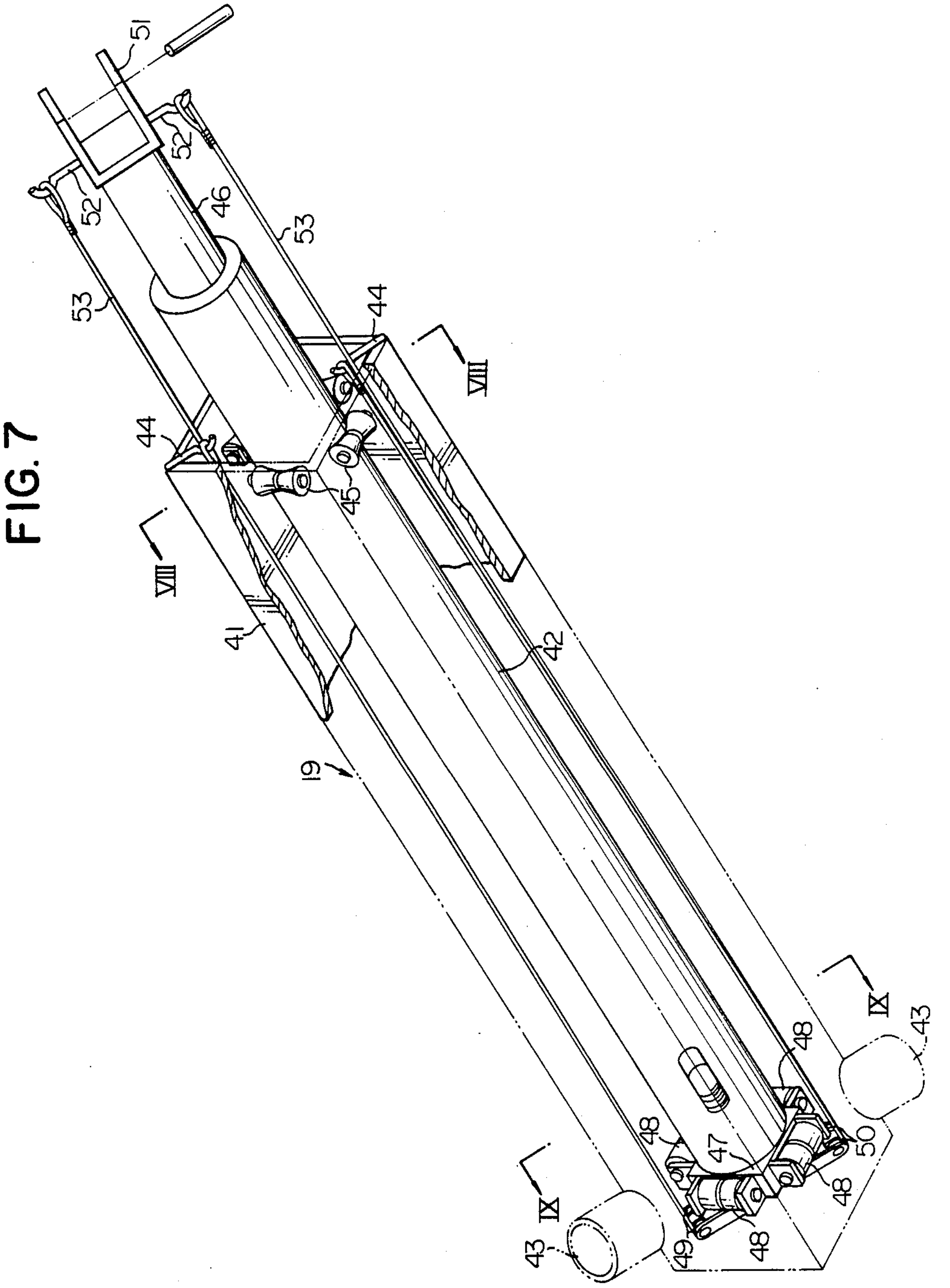
FIG. 7 is a perspective view, partly cut away, of a hydraulic mechanism.

FIG. 7 shows in detail the internal construction of each of the hydraulic mechanisms 19. The hydraulic mechanism 19 is generally constructed of a hollow outer frame 41 and a hydraulic cylinder 42 inserted in the hollow outer frame 41. The outer frame 41 is of a rectangular cross section having open ends with shafts 43 projecting laterally from a lower end of the outer frame 42 and rotatably supported by a frame (not shown) on the chassis 1. Wire hooks 44 are secured to an upper end of the outer frame 41 and extend laterally toward the center of the outer frame 41. Upper rollers 45 are rotatably supported on four inner wall surfaces of the outer frame 41 and disposed in surrounding relation to the central axis of the outer frame 41. The hydraulic cylinder 42 includes a single piston rod 46 projecting from one end thereof, there being a square base 47 secured to the other end of the hydraulic cylinder 42. Lower rollers 48 are rotatably supported respectively on four sides of the square base 47 and are held in rolling contact with inner wall surfaces of the outer frame 41. The upper rollers 45 are held in rolling contact with an outer peripheral surface of the hydraulic cylinder 42. Therefore, the hydraulic cylinder 42 is longitudinally movably supported by the upper and lower rollers 45, 48 in the outer frame 41. A pair of pulleys 49, 50 is mounted on the lower surface of the base 47 in diametrically opposite relation to each other across the central axis of the hydraulic cylinder 42, the pulleys 49, 50 being 45° displaced from the lower roller 48. A substantially C-shaped connector 51 for connection to the shaft 18 is secured to the distal end of the piston rod 46. A pair of wire hooks 52 projects laterally from the connector 51. Wires 53 have ends hooked on the wire hooks 52, pass through a space between the outer frame 41 and the hydraulic cylinder 42 toward the pulleys 50, are trained around the pulleys 50, respectively, pass again through the space in the outer frame 41 toward the hooks 44, and have opposite ends hooked on the wire hooks 44. The hydraulic cylinder 42 is suspended in the outer frame 41 by the wires 53, which are symmetrically positioned with respect to the hydraulic cylinder 42.

Figure 8:
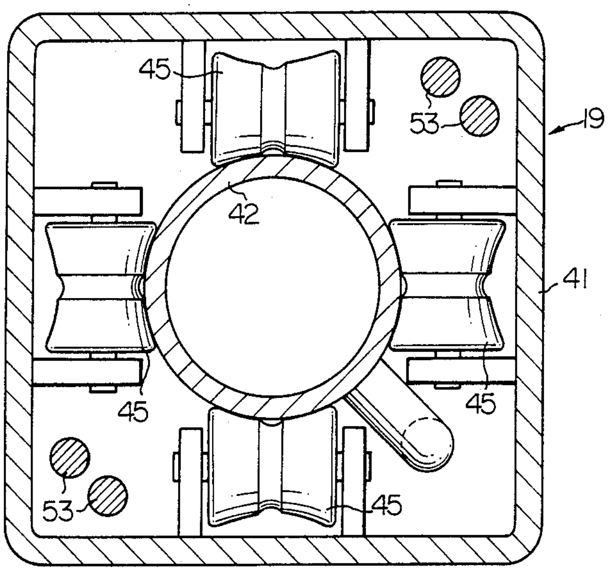
FIG. 8 is a cross-sectional view taken along line VIII—VIII of FIG. 7.
Figure 9:
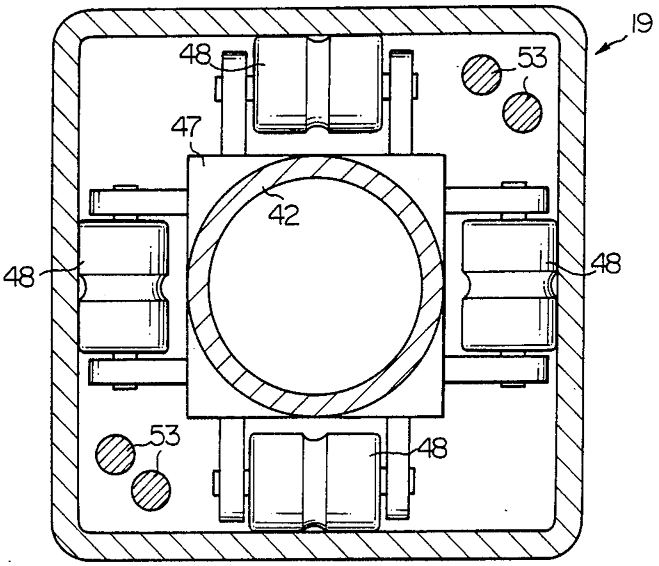
FIG. 9 is a cross-sectional view taken along line IX—IX of FIG. 7.

FIGS. 8 and 9 are cross-sectional views taken along lines VIII—VIII and IX—IX of FIG. 7.

Figure 10:
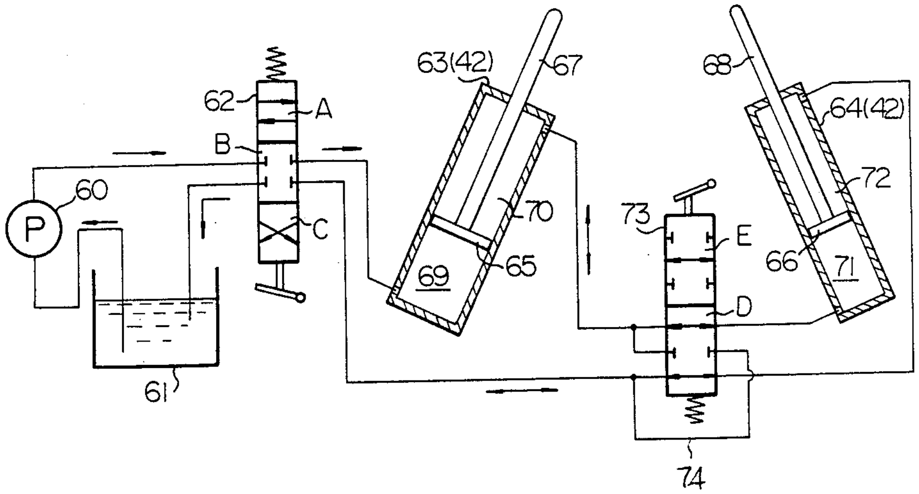
FIG. 10 is a diagram of a hydraulic circuit for hydraulic mechanisms.

FIG. 10 shows a hydraulic circuit for the hydraulic mechanisms. A hydraulic pump 60 has an inlet port communicating with an oil tank 61 and an outlet port with a directional control valve 62 having a return path communicating with the oil tank 61. Two hydraulic cylinders 63, 64 (corresponding to the hydraulic cylinders 42 in FIG. 7) include pistons 65, 66 slidably disposed therein and having piston rods 67, 68, respectively. The pistons 65, 66 divide the interior of the hydraulic cylinders 63, 64 into pressure chambers 69, 71 and discharge chambers 70, 72. The pressure chamber 69 is in communication with the directional control valve 62. The discharge chamber 70 is connected by a directional control valve 73 to the pressure chamber 71. The discharge chamber 72 is connected by the directional control valve 73 to the directional control valve 62. A bypass path 74 is connected to the directional control valve 73. The directional control valve 62 has three blocks A, B, C. The block A serves to lift the elevating mechanism, the block B to stop the elevating mechanism, and the block C to lower the elevating mechanism. The directional control valve 73 has two blocks D, E, the block D serving to move the elevating mechanism vertically, and the block E to move the elevating mechanism horizontally. The block D is normally in an operative position as shown in FIG. 10, closing the bypass path 74.

Figures 11A, 11B, 11C:
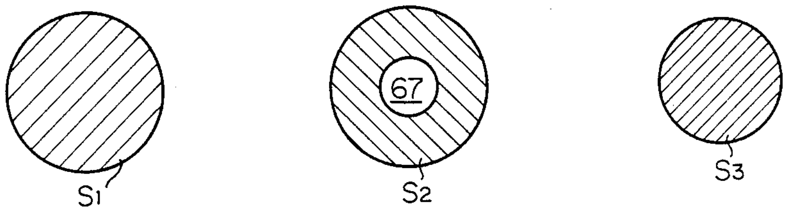
FIGS. 11A through 11C are diagrams showing cross-sectional areas in hydraulic cylinders.

The pressure chamber 69 has a cross-sectional area $S_1$ as shown in FIG. 11A, the discharge chamber 70 has a cross-sectional area $S_2$ as shown in FIG. 11B, with the cross-sectional area of the piston rod 67 being removed, and the pressure chamber 71 has a cross-sectional area $S_3$. The cross-sectional areas $S_2$, $S_3$ are equal to each other.

Operation of the elevating apparatus according to the foregoing embodiment will be described below.

An engine (not shown) mounted on the chassis 1 is actuated to drive the pump 60 for generating a hydraulic pressure.

(i) Vertical Upward Movement of the Platform 7

The block D is in the operative position in the directional control valve 73. When the directional control valve 62 is shifted from the block B to the block A, oil under pressure is supplied from the pump 60 through the directional control valve 62 into the hydraulic cylinders 63, 64 (42). The piston rods 46 are projected out of the hydraulic cylinders 42 so that the distance between the base 47 and the connector 51 will be increased in each hydraulic mechanism. In each hydraulic mechanism, the wires 53 extending between the wire hooks 44, 52 are tensioned and the distance between the wire hooks 52 and the pulleys 49, 50 is increased. Since the wires 53 themselves are constant in length and are not elongated under load, the length of the wires 53 between the wire hooks 44 and the pulleys 49, 50 is reduced, so that the hydraulic cylinder 42 projects out of the upper opening in the outer frame 41. The movement of the hydraulic cylinder 41 is governed by the interval that the piston rod 46 is extended. The distance between the connector 51 and the remote end of the outer frame 41 is the sum of the interval that the piston rod 46 projects from the hydraulic cylinder 42 and the interval that the hydraulic cylinder 42 projects from the outer frame 41, or is substantially equal to about twice the extent of projection of the hydraulic cylinder 42. As the connector 51 projects out of the outer frame 41 in response to operation of each hydraulic mechanism 19, the middle booms 10 are lifted upwardly to draw the lower boom 11 and the upper boom 12 out of the middle boom 10. Since the lower boom 11 and the upper boom 12 are interconnected by the chain 27, when the lower boom 11 is moved progressively out of the middle boom 10, the chain 27 secured to the end of the lower boom 11 is moved along while rotating the sprockets 25, 26 to pull up the lower end of the upper boom 12 for thereby drawing the upper boom 12 out of the upper end of the middle boom 10. With the chain 27 not elongated, the lower and upper booms 11, 12 are drawn out of the middle boom 10 for the same interval. Accordingly, the paired lower and upper booms 11, 12 are extended the same interval, enabling the middle booms 10 to unfold into an X shape while being angularly moved about the shaft 13. The platform 7 is therefore lifted while kept in a horizontal position. The height to which the platform 7 can ascend is dependent on the interval by which the hydraulic mechanisms 19 are extended. The maximum height to which the platform 7 can be raised is relatively large since the piston rod 46 is extended the interval which is twice greater than would be if the cylinder 42 were fixed and no wires 53 were employed.

Figure 12:
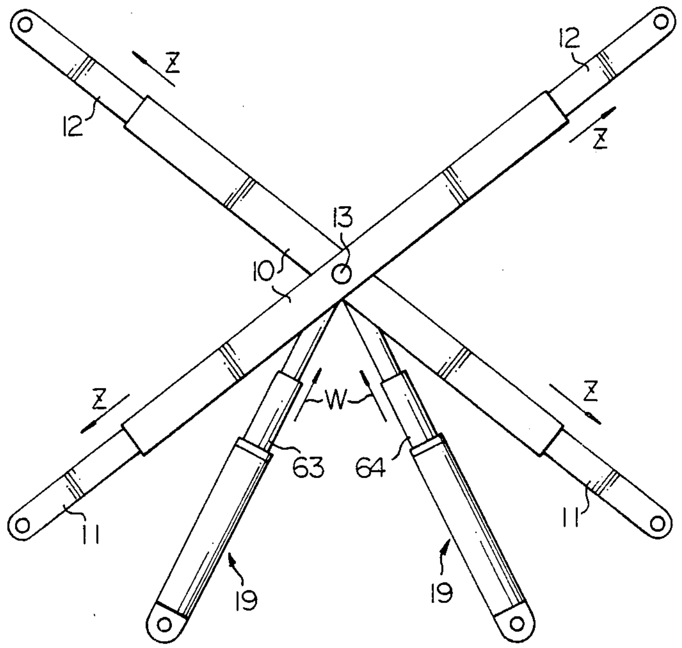
FIG. 12 is a side elevational view of the elevating mechanism and the hydraulic mechanisms as they are interconnected.
Figure 14:
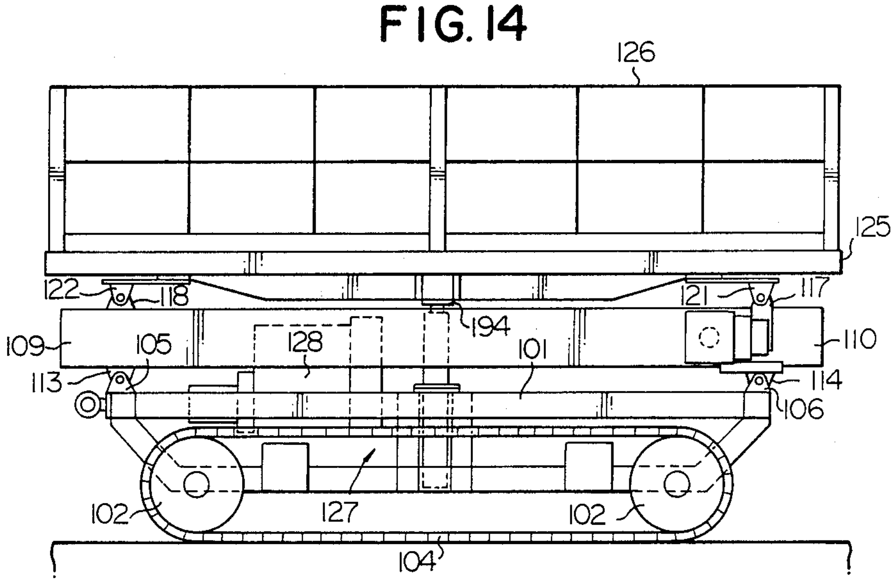
FIG. 14 is a side elevational view of an elevating apparatus according to another embodiment of the present invention.

The relationship between the elevating mechanism 6 and the hydraulic mechanisms 19 will be described with reference to FIG. 10. The working oil is pumped by the pump 60 from the oil tank 61 and supplied under pressure to the directional control valve 62 with the block A in the operative position. The working oil is fed into the pressure chamber 69 to raise the piston 65 and the piston rod 67. As the piston 65 is slid upwardly, the working oil is discharged out of the discharge chamber 70 and fed through the directional control valve 73 into the pressure chamber 71 in the hydraulic cylinder 64 wherein the piston 66 and the piston rod 68 are raised. The working oil is now discharged from the discharge chamber 72 and flows through the directional control valves 73, 62 back into the oil tank 61. Since the pressure chambers 69, 71 and the discharge chamber 70 are of cross-sectional areas as shown in FIGS. 11A through 11C, when the piston 65 is moved a given distance, the volume of working oil discharged from the discharge chamber 70 is equal to the cross-sectional area $S_2$ as multiplied by the distance that the piston 65 is displaced. By introducing this volume of working oil into the pressure chamber 71 of the same cross section $S_3$, the piston 66 is moved a distance equal to the distance of movement of the piston 65. Therefore, the lengths of extended movement of the piston rods 67, 68 are equalized to each other. Since the hydraulic mechanisms 19 lie on the equal sides of an isosceles triangle with its vertex on the shaft 13, the shaft 13 will be moved vertically with respect to the chassis 1 at all times if the piston rods 67, 68 extend the same interval. The lower and upper booms 11, 12 are drawn from the middle boom 10 for the same interval in synchronism, and hence all of the lower and upper booms 11, 12 are extended the same distance, with the result that the platform 7 is lifted perpendicularly to the chassis 1 while being kept parallel to the chassis 1. The intervals of movement will be described with reference to FIG. 12. The hydraulic mechanisms 19 extend the same interval W to lift the shaft 13 along a straight line and to cause all of the lower and upper booms 11, 12 to be extended the same interval Z in synchronism. FIGS. 3 and 4 illustrate the platform 7 as elevated.

(ii) Vertical Downward Movement of the Platform 7

When the directional control valve 62 is shifted from the block B to the block C, the working oil flows in a direction opposite to the direction described above. The piston rods 67, 68 are retracted into the hydraulic cylinders 63, 67 to allow the platform 7 downwardly in a vertical direction.

(iii) Horizontal Movement of the Platform 7

For horizontally moving the platform 7 while the platform 7 is in the elevated position as illustrated in FIG. 3, the block B is held in the operative position in the directional control valve 62 to keep the vertical position of the platform 7. Then, the block E is brought into the operative position in the directional control valve 73 to put the discharge chamber 70 and the bypass path 74 in mutual communication. When the direction control valve 62 is shifted to the block A to supply the working oil to the pressure chamber 69 for thereby pushing the piston 65 to force the working oil from the discharge chamber 70 through the directional control valve 73, the bypass path 74, and the directional control valve 62 back to the oil tank 61. The movement of the piston 65 causes the piston rod 67 to be pushed out of the hydraulic cylinder 63. The piston rod 68 remains at rest since no working oil is supplied to the pressure chamber 71 in the hydraulic cylinder 64. The hydraulic mechanisms 19 no longer form an isosceles triangle, but the piston rod 67 of only one of the hydraulic mechanisms 19 is extended. The upper and lower booms 12, 11 are extended from only one of the paired middle booms 10 to the length smaller than the length of the upper and lower booms 12, 11 from the other middle boom 10. The hydraulic mechanisms 19 now form a deformed triangle and move the platform 7 horizontally in the direction of the arrow F as shown in FIG. 13.

Figure 13:
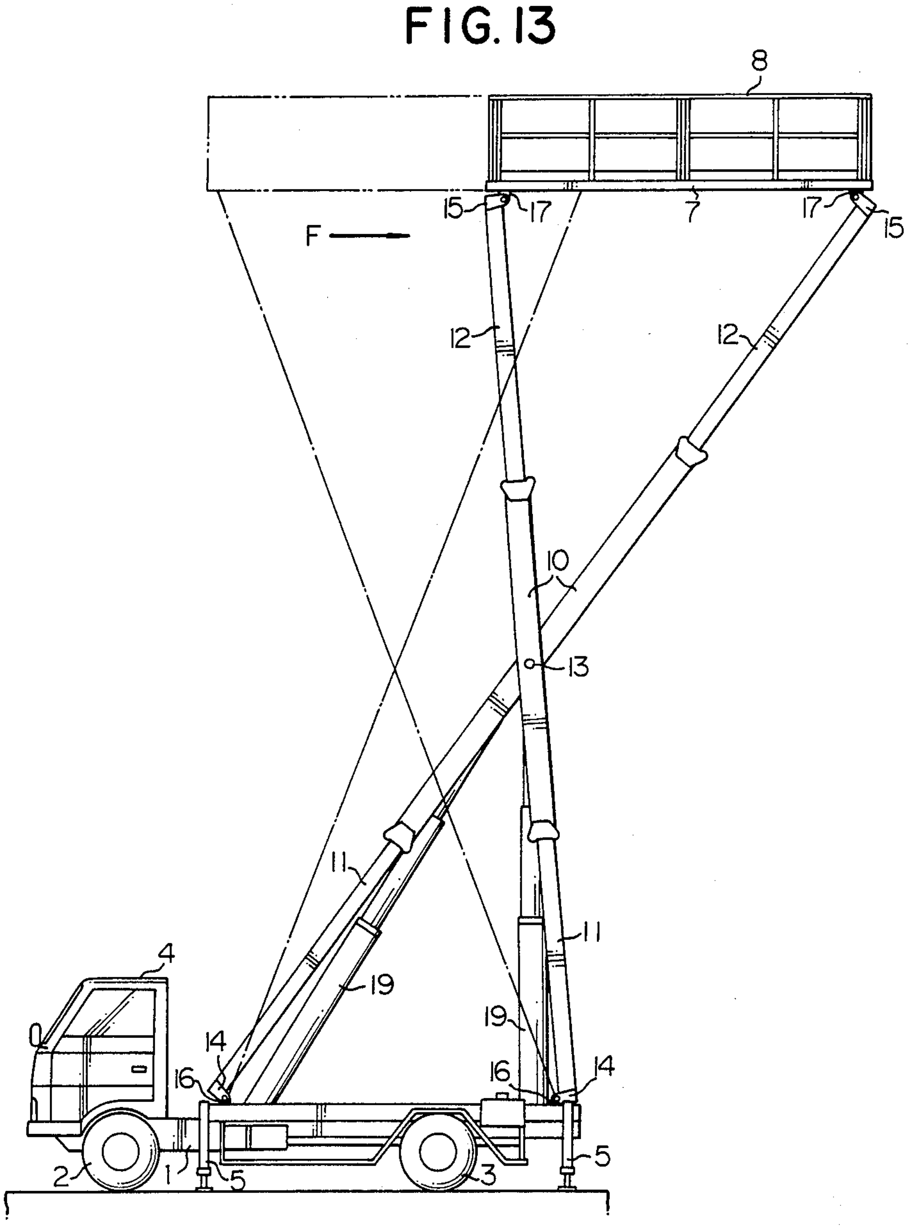
FIG. 13 is a side elevational view of the elevating apparatus with a platform moved horizontally.
Figure 15:
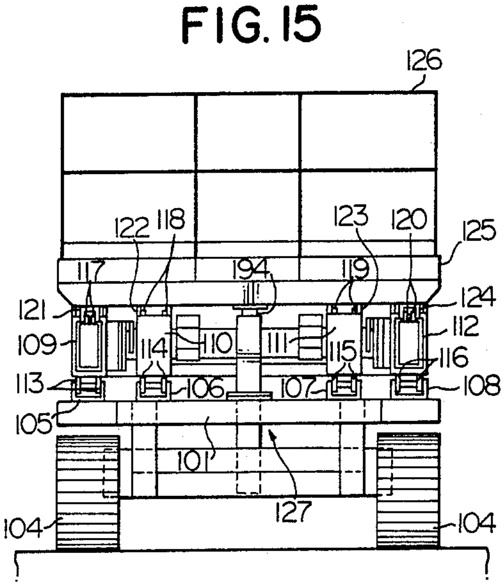
FIG. 15 is a front elevational view of the elevating apparatus shown in FIG. 14.

In order to move the platform 7 horizontally back from the solid-line position of FIG. 13 to a position vertically above the chassis 1, the block C of the directional control valve 62 is brought into the operative position to supply the working oil in an opposite direction to retract the piston rod 67 into the hydraulic cylinder 10 until the hydraulic mechanisms 19 form an isosceles triangle again. Thereafter, the block D is brought into the operative position in the directional control valve 73.

FIGS. 14 through 20 shows the construction of a elevating apparatus according to another embodiment of the present invention.

The elevating apparatus includes a chassis or base 101 with front and rear wheels 102 rotatably mounted on the chassis 101 and disposed therebelow. Endless tracks or caterpillar belts are trained around the front and rear wheels 102. Fixed members 105, 106, 107, 108 are mounted on the chassis 1 at front and rear positions on an upper surface thereof. A boom assembly 109 has a connector 113 secured to a lower surface thereof and pivotally coupled by a pin to the fixed member 105. Likewise, boom assemblies 110, 111, 112 have connectors 114, 115, 116 secured to lower surfaces thereof and pivotally coupled by pins to the fixed members 106, 107, 108, respectively. The boom assemblies 109, 112 are angularly movable with respect to the boom assemblies 110, 111, respectively, in folable and unfoldable X-shaped configurations. The boom assemblies 109, 112, and the boom assemblies 110, 111 have upper ends located horizontally away from each other. Connectors 117 through 120 are mounted on the upper ends of the boom assemblies 109 through 112, respectively, and pivotally coupled by pins to fixed members 121 through 124, respectively, mounted on a platform 125 at lower four corners thereof. Therefore, the chassis 101 and the platform 125 are relatively movably interconnected by the X-shaped boom assemblies 109 through 112. A handrail 126 is mounted on and extends around the platform 125. A kick mechanism 127 is mounted centrally on and projects upwardly from the chassis 101. A hydraulic pressure generator mechanism 128 is also mounted on the chassis 101 adjacent to the kick mechanism 127.

Figure 16:
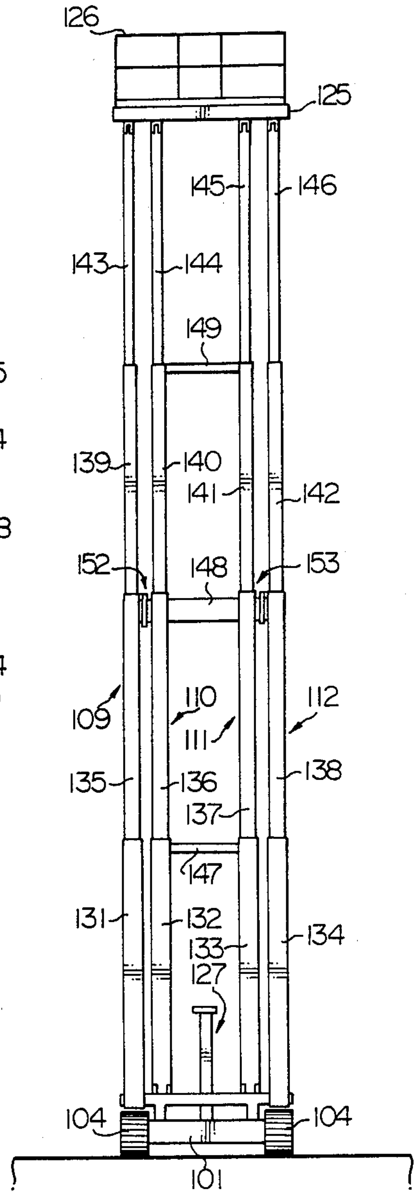
FIG. 16 is a front elevational view of the elevating apparatus with a platform lifted to an uppermost position.
Figure 17:
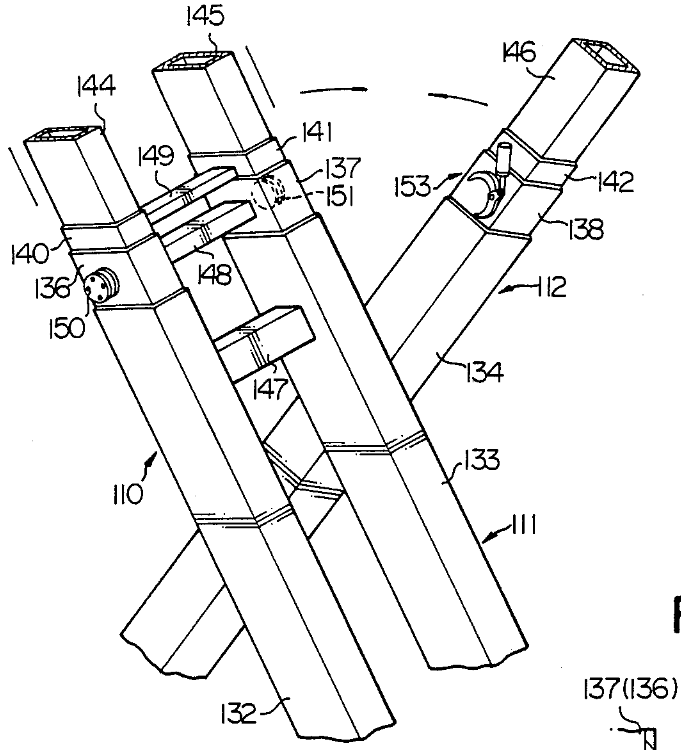
FIG. 17 is an enlarged fragmentary perspective view of booms near a clamp mechanism.

The boom assemblies 109 through 112 comprise first booms 131 through 134, respectively, second booms; 135 through 138, respectively, third booms 139 through 142, respectively, and fourth booms 143 through 146, respectively. The second booms 135 through 138 are telescopically inserted in the first booms 131 through 134, respectively, the third booms 139 through 142 are telescopically inserted in the second booms 135 through 138, respectively, and the fourth booms 143 through 146 are telescopically inserted in the third booms 139 through 142, respectively. Each of the booms 131 through 146 is made of thin sheet steel and has a hollow rectangular cross section. A connector rod 147 is interconnected between the upper distal ends of the first booms 132, 133 in perpendicular relation, a connector rod 148 is interconnected between the upper distal ends of the second booms 136, 137 in perpendicular relation, and a connector rod 149 is interconnected between the upper distal ends of the third booms 140, 141 in perpendicular relation. The boom assemblies 110, 111 as interconnected by the connector rods 147, 148, 149 assume the shape of a ladder, as shown in FIG. 16. Cylindrical holders 150, 151 are secured to upper side surfaces of the booms 136, 137, respectively, and clamp mechanisms 152, 153 for engaging the cylindrical holders 150, 151, respectively, are fixed to upper side surfaces of the booms 135, 138, respectively.

Figure 18:
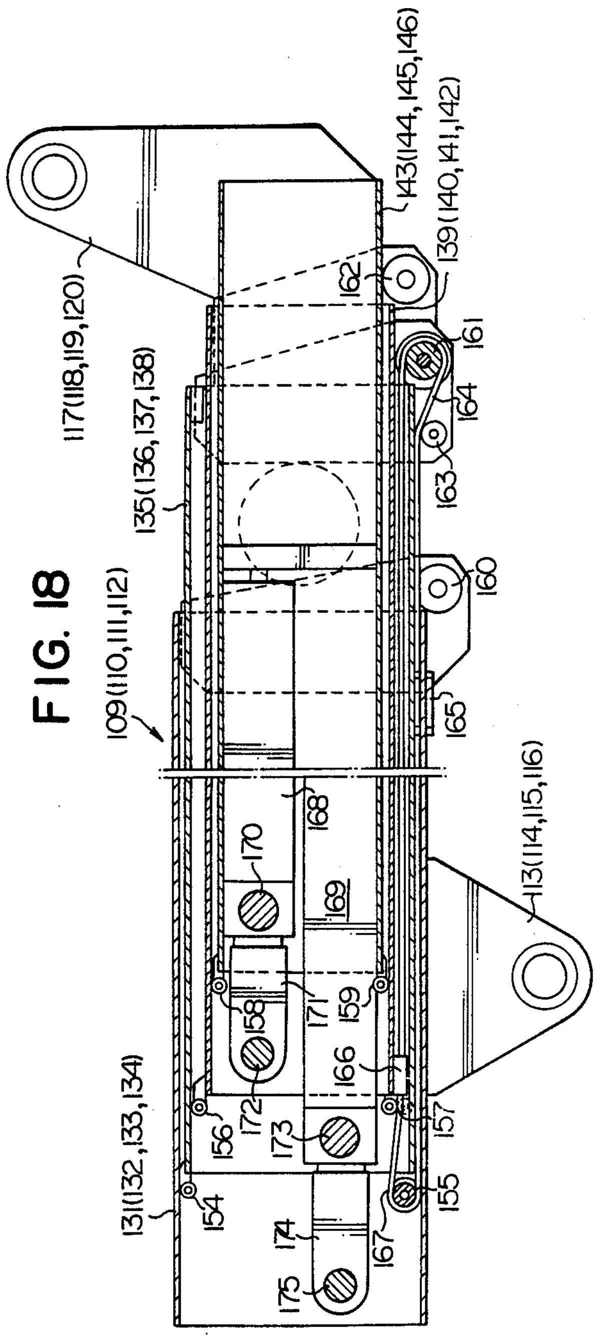
FIG. 18 is a longitudinal cross-sectional view of a boom.

FIG. 18 illustrates an internal structure of each of the boom assemblies 109 through 112. The boom assembly 109 only will be described in detail by way of illustrative example, but the other boom assemblies 110 through 112 are of the same construction. Rollers 154 through 159 are rotatably mounted on lower ends of the booms 135, 139, 143. The rollers 154, 155 are held in rolling contact with inner surfaces of the boom 131, the rollers 156, 157 are held in rolling contact with inner surfaces of the boom 135, and the rollers 158, 159 are held in rolling contact with inner surfaces of the boom 139. Rollers 160, 161, 162 are rotatably mounted on the booms 131, 135, 139, respectively, on their distal ends at lower portions thereof. The rollers 160, 161, 162 being held in rolling contact with outer surfaces of the booms 135, 139, 143, respectively. A roller 163 is rotatably mounted on the distal end of the boom 135 adjacent to the roller 161. A chain 164 is trained around the rollers 161, 163 and has one end connected to an attachment 166 fixed to the lower end of the boom 139 and an opposite end connected to an attachment 165 secured to the distal end of the boom 131. A chain 167 is trained around the roller 155 and has opposite ends connected to the attachments 165, 166, respectively. Hydraulic cylinders 168, 169 are disposed parallel to each other in the boom 143, the hydraulic cylinder 168 being fixed by a pin 170 to the boom 143 and having a piston rod 171 secured by a pin 172 to the boom 139. The hydraulic cylinder 169 is secured by a pin 173 to the boom 135 and has a piston rod 174 secured by a pin 175 to the boom 131.

Figure 19:
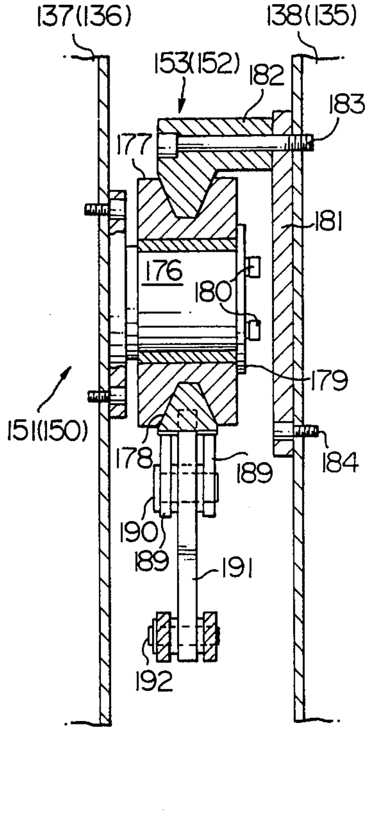
FIG. 19 is a cross-sectional view of a holder and the clamp mechanism.
Figure 20:
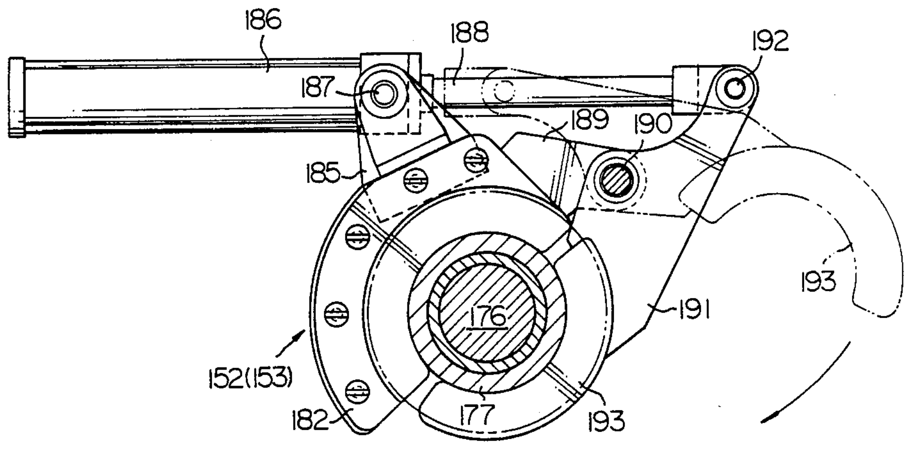
FIG. 20 is a plan view of the clamp mechanism.

FIGS. 19 and 20 show the holders 150, 151 and the clamp mechanisms 152, 153 in greater detail. Only the holder 151 and the clamp mechanism 153 will be described, but the holder 150 and the clamp mechanism 152 are of the same construction. The holder 150 is composed of a cylindrical post 176 fixed to the side surface of the boom 137 and an annular slide ring 177 rotatably fitted over the post 176 and having a groove 178 of a substantially V-shaped cross section defined in an outer peripheral surface thereof. The slide ring 177 is retained on the post 176 by a retainer plate 179 fastened by bolts 180 to an end of the post 176. An attachment plate 181 and a semicircular grip hand 182 with an inner wall of a substantially V-shaped cross section are fastened by bolts 183, 184 to the side of the boom 138. Holders 185, 189 are secured to an outer peripheral surface of the connector 182. An end of a hydraulic cylinder 186 is pivotally coupled by a pin 187 to the holder 185, and an actuator 191 is pivotally coupled by a pin 190 to the holder 189. The hydraulic cylinder 186 includes a piston rod 188 having a distal end coupled by a pin 192 to the actuator 191. Another semicircular grip hand 193 is fixed to the actuator 191 and has an inner wall of a substantially V-shaped cross section.

Operation of the elevating apparatus of the second embodiment will be described with reference to FIGS. 21A, 21B, and 21C.

Figure 21A:
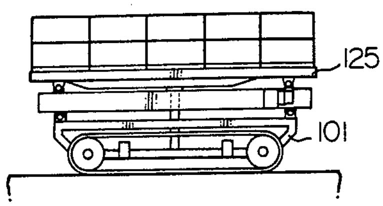
FIGS. 21A through 21C are side elevational views showing progressive operation of the elevating apparatus of FIG. 14.

For moving elevating apparatus, the elevating mechanism is folded and the chassis 101 is driven as shown in FIG. 21A. When the platform 125 is to be raised by extending the boom assemblies 109 through 112, an engine (not shown) on the chassis 101 is operated to deliver hydraulic pressure generated by the hydraulic pressure generator mechanism 128 to the various hydraulic cylinders. More specifically, oil under pressure is first supplied to the kick mechanism 127 to lift a kick pin 194 which raises the platform 125 in an initial period. At the same time, the piston rods 171 of the hydraulic cylinders 168 are extended to draw the booms 143–146 from the booms 139–142 to increase the distance between the supports 113–116 and the supports 117–120 so that the booms 143–146 will turn about the supports 113–116. The boom assemblies 9, 12 and the boom assemblies 110, 111 are progressively raised in opposite directions while following the pattern of an unfolding fan, thus lifting the platform 125 as illustrated in FIG. 21B.

Figure 21C:
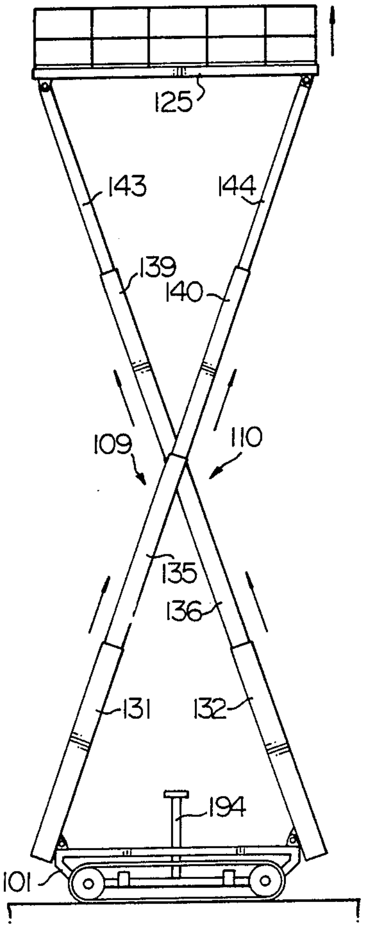

When the hydraulic cylinders 168 have been extended to their full stroke, the booms 143–146 are fully extended from the booms 139–142 where the distal ends of the second booms 135–138 are closely aligned horizontally as shown in FIG. 21C. The slide ring 177 of each of the holders 150, 151 on the booms 136, 137 is fitted into the semicircular opening in the grip hand 182 so that the grip hand 182 engages in the groove 178 in the slide ring 177. Thereafter, the hydraulic cylinder 186 is actuated to push out the piston rod 188 to rotate the actuator 191 and the grip hand 19 clockwise (FIG. 20) about the pin 190 until the grip hand 193 is fitted into the groove 178. The slide ring 177 is now sandwiched between the grip hands 182, 193. The holders 150, 151 are now coupled to the clamp mechanisms 152, 153. The booms 135, 136 and the booms 137, 138 are now angularly movably coupled together, and the boom assemblies 9, 10 and the boom asemblies 11, 12 are in the shape of an X when seen in side elevation. The hydraulic cylinders 169 are then actuated to extend the piston rods 174 for pushing the booms 135–138 out of the booms 131–134. As the booms 135–138 slide out of the booms 131–134, the rollers 161 draw the chains 164 to pull the booms 139–142 connected to the chains 164 out of the booms 135–138. Accordingly, actuation of the hydraulic cylinders 169 simultaneously moves the booms 131–134, the booms 135–138, and the booms 139–142. The booms 135–142 are drawn out in synchronism such that the booms 135–138 and the booms 139–142 are extended equal intervals with respect to the booms 131–134 above and below the holders 150, 151. The boom assemblies 109–112 are extended to form an X-shaped structure which is vertically symmetrical for thereby lifting the platform 125 to a maximum height as shown in FIG. 21C.

Figure 21B:
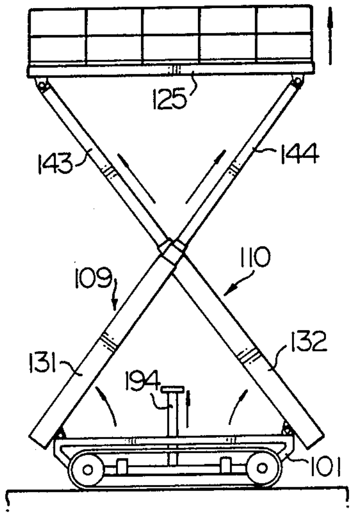

For lowering the platform 125, the foregoing process is reversed to cause the boom assemblies 109–112 to collapse from the position of FIG. 21C through the position of FIG. 21B to the position of FIG. 21A.

Although certain preferred embodiments have been shown and described, it should be understood that many changes and modifications may be made therein without departing from the scope of the appended claims.

What is claimed is:

1. An elevating apparatus comprising:

(a) a base;

(b) a platform;

(c) at least a pair of pivotally interconnected boom assemblies connecting said base and said platform together, said pair of boom assemblies including a pair of hollow middle booms pivotally interconnected substantially centrally thereof by a shaft, and upper and lower booms telescopically disposed in each of said middle booms and movable out of upper and lower ends of said middle booms, said lower booms having ends pivotally mounted on said base in spaced relation and said upper booms having ends pivotally mounted on said platform in spaced relation, each of said boom assemblies including means for synchronzing intervals of extension of said upper and lower booms from said middle boom; and (d) a pair of hydraulic mechanisms operatively coupled between said shaft and said base at spaced locations thereon for moving said middle booms to displace said upper and lower booms into and out of said middle booms to lift and lower said platform, said hydraulic mechanisms being composed of a hollow outer frame pivotally connected at one end of said base, a hydraulic cylinder longitudinally movably mounted in said outer frame and capable of telescopically moving at least one stage, and a synchronous pushing mechanism interposed between said outer frame and said hydraulic cylinder for pushing said hydraulic cylinder out of said outer frame with an extension of said hydraulic cylinder and (e) means for selectively controlling said hydraulic mechanisms to move said platform substantially vertically and horizontally, said selectively controlling means comprising a hydraulic circuit composed of a source of hydraulic pressure, a first directional control valve connected between said source of hydraulic pressure and one of said hydraulic mechanisms and a second directional control valve connected between the pair of said hydraulic mechanisms, said first directional control valve having three selectable positions to supply hydraulic pressure to said one of the hydraulic mechanisms, stop the hydraulic pressure to said one hydraulic mechanism, and, relieve pressure from said one hydraulic mechanism, said second directional control valve having two selectable positions for delivering hydraulic pressure from said one to said other hydraulic mechanism, and, relieving pressure from said other hydraulic mechanism.

2. An elevating apparatus according to claim 1, wherein each of said hydraulic mechanisms comprises an outer frame pivotally connected at one end to said base, a hydraulic cylinder longitudinally movably mounted in said outer frame, a piston rod slidably disposed in said hydraulic cylinder and having an end pivotally connected to said shaft, and means interconnecting said outer frame and said piston rod for substantially doubling an extension of said piston rod in response to actuation of said hydraulic cylinder.

3. An elevating apparatus according to claim 1, wherein said outer frame is pivotally connected at one end of said base, and an end of said hydraulic cylinder is connected to said shaft.

4. An elevating apparatus according to claim 1, wherein said synchronous pushing mechanism comprises a first engaging member fixed to an open end of said outer frame, a second engaging member fixed to an end of said hydraulic cylinder, pulleys pivotally supported on the base of said hydraulic cylinder, a wire stretched between said first and second engaging members and trained around said pulleys, said wire being altered in its direction by pulleys.

5. An elevating apparatus comprising:

(a) base;

(b) a platform;

(c) at least a pair of boom assemblies connecting said base and said platform together, said pair of boom assemblies including a plurality of telescopically interfitting booms, said booms having ends mounted on said platform in spaced relation and ends mounted on said base in spaced relation, each of said boom assemblies including means for synchronizing intervals of extension of the booms;

(d) a plurality of hydraulic cylinders disposed in each of said boom assemblies and operatively connecting said booms for displacing said booms into and out of each other to lift and lower said platform; and (e) hydraulically operated means on the boom assemblies for pivotally clamping together adjacent booms while allowing the adjacent booms to be angularly moved relative to each other when the boom assemblies are extended to a X shape.

6. An elevating apparatus according to claim 5, wherein said means includes a holder mounted on one of said adjacent booms and a clamp mechanism mounted on the other of said adjacent booms for clampingly engaging said holder.

7. An elevating apparatus comprising:

(a) a base;

(b) a platform;

(c) at least a pair of pivotally interconnected boom assemblies connecting said base and said platform together, said pair of boom assemblies including a pair of hollow middle booms pivotally interconnected substantially centrally thereof by a shaft, and upper and lower booms telescopically disposed in each of said middle booms and movable out of upper and lower ends of said middle booms, said lower booms having ends pivotally mounted on said base in spaced relation and said upper booms having ends pivotally mounted on said platform in spaced relation, each of said boom assemblies including means for synchronizing intervals of extension of said upper and lower booms from said middle boom; and (d) a pair of hydraulic mechanisms operatively coupled between said shaft and said base at spaced locations thereon for moving said middle booms to displace said upper and lower booms into and out of said middle booms to lift and lower said platform, each of said hydraulic mechanisms comprising an outer frame pivotally connected at one end to said base, a hydraulic cylinder longitudinally movably in said outer frame, a piston rod slidably disposed in said hydraulic cylinder and having an end pivotally connected to said shaft and means interconnecting said outer frame and said piston rod for substantially doubling an extension of said piston rod in response to actuation of said hydraulic cylinder, said outer frame having a plurality of rollers held in rolling contact with an outer peripheral surface of said hydraulic cylinder and said hydraulic cylinder having a plurality of rollers held in rolling contact with inner surfaces of said outer frame.

8. An elevating apparatus comprising:

(a) a base;

(b) a platform;

(c) at least a pair of pivotally interconnected boom assemblies connecting said base and said platform together, said pair of boom assemblies including a pair of hollow middle booms pivotally interconnected substantially centrally thereof by a shaft, and upper and lower booms telescopically disposed in each of said middle booms and movable out of upper and lower ends of said middle booms, said lower booms having ends pivotally mounted on said base in spaced relation and said upper booms having ends pivotally mounted on said platform in spaced relation, each of said boom assemblies including means for synchronizing intervals of extension of said upper and lower booms from said middle boom; and (d) a pair of hydraulic mechanisms operatively coupled between said shaft and said base at spaced locations thereon for moving said middle booms to displace said upper and lower booms into and out of said middle booms to lift and lower said platform, each of said hydraulic mechanisms comprising an outer frame pivotally connected at one end to said base, a hydraulic cylinder longitudinally movably mounted in said outer frame, a piston rod slidably disposed in said hydraulic cylinder and having an end pivotally connected to said shaft and means interconnecting said outer frame and said piston rod for substantially doubling an extension of said piston rod in response to actuation of said hydraulic cylinder, said interconnecting means further comprising first hooks mounted on said outer frame, rollers mounted on said hydraulic cylinder, second hooks mounted on said piston rod, and wires having ends hooked on said first and second hooks and trained around said rollers and extending substantially along said hydraulic cylinder and said piston rod in said outer frame.

9. An elevating apparatus comprising:

(a) base;

(b) a platform;

(c) at least a pair of boom assemblies connecting said base and said platform together, said pair of boom assemblies including a plurality of telescopically interfitting booms, said booms having ends mounted on said platform in spaced relation and ends mounted on said base in spaced relation, each of said boom assemblies including means for synchronizing intervals of extension of the booms;

(d) a plurality of hydraulic cylinders disposed in each of said boom assemblies and operatively connecting said boom assemblies for displacing said booms into and out of each other to lift and lower said platform; and (e) means on the boom assemblies for pivotally clamping together adjacent booms together while allowing the adjacent booms to be angularly moved relative to each other when the boom assemblies are extended into a X shape, said means including a holder mounted on one of said adjacent booms and a clamp mechanism mounted on the other of said adjacent booms for clampingly engaging said holder, said holder comprising a cylindrical post and a slide ring rotatably mounted thereon and having an annular groove, said clamp mechanism including a substantially semicircular first grip hand fixed to said other boom and fittable into said annular groove in said slide ring, a substantially semicircular second grip hand pivotally mounted on said first grip hand, and hydraulic cylinder having a piston rod pivotally coupled to said second grip hand for causing said second grip hand into said annular groove.

10. An elevating apparatus comprising:

(a) a base;

(b) a platform;

(c) at least a pair of pivotally interconnected boom assemblies connecting said base and said platform together, said pair of boom assemblies including a pair of hollow middle booms pivotally interconnected substantially centrally thereof by a shaft, and upper and lower booms telescopically disposed in each of said middle booms and movable out of upper and lower ends of said middle booms, said lower booms having ends pivotally mounted on said base in spaced relation and said upper booms having ends pivotally mounted on said platform in spaced relation, each of said boom assemblies including means for synchronizing intervals of extension of said upper and lower booms from said middle boom; and (d) a pair of hydraulic mechanisms operatively coupled between said shaft and said base at spaced locations thereon for moving said middle booms to displace said upper and lower booms into and out of said middle booms to lift and lower said platform, each of said hydraulic mechanisms composed of first and second hydraulic cylinders interposed between said shaft and said base at a spaced relation at two points, a discharge side of said first hydraulic cylinder being connected in series with a pressure side of said second hydraulic cylinder via a valve capable of switching a fluid passage, an extension rate of said first hydraulic cylinder being equal to that of said second hydraulic cylinder when fluid under pressure is supplied in series to said first and second hydraulic cylinders by selectively actuating said valve to enable to lift vertically said platform, and said platform being moved laterally when fluid under pressure is supplied only to said first hydraulic cylinder by selectively actuating said valve.

* * * * *